United States Patent
Cho et al.

(10) Patent No.: US 7,953,119 B2
(45) Date of Patent: May 31, 2011

(54) METHOD AND APPARATUS FOR TRANSMITTING/RECEIVING DOWNLINK SYNCHRONIZATION CHANNELS IN A CELLULAR COMMUNICATION SYSTEM SUPPORTING SCALABLE BANDWIDTH

(75) Inventors: Joon-Young Cho, Suwon-si (KR); Ju-Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 850 days.

(21) Appl. No.: 11/866,153

(22) Filed: Oct. 2, 2007

(65) Prior Publication Data

US 2008/0080476 A1    Apr. 3, 2008

(30) Foreign Application Priority Data

Oct. 2, 2006    (KR) .................. 10-2006-0097352

(51) Int. Cl.
*H04J 3/06*    (2006.01)
*H04W 4/00*    (2009.01)
*H04W 36/00*    (2009.01)
*H04B 1/00*    (2006.01)

(52) U.S. Cl. ......... 370/503; 370/328; 455/442; 375/145

(58) Field of Classification Search .......... 370/310–350, 370/503–520; 455/422.1, 542, 543, 561, 455/550.1, 556.2; 375/260, 267, 326, 344
See application file for complete search history.

(56) References Cited

U.S. PATENT DOCUMENTS

| | | | |
|---|---|---|---|
| 6,807,147 B1 | 10/2004 | Heinonen et al. | |
| 7,292,548 B2* | 11/2007 | Lim et al. | 370/328 |
| 2003/0095516 A1* | 5/2003 | Ok et al. | 370/331 |
| 2003/0169702 A1* | 9/2003 | Ryu et al. | 370/320 |
| 2005/0002369 A1 | 1/2005 | Ro et al. | |
| 2005/0075125 A1 | 4/2005 | Bada et al. | |
| 2006/0078040 A1 | 4/2006 | Sung et al. | |
| 2006/0126491 A1 | 6/2006 | Ro et al. | |
| 2007/0190967 A1 | 8/2007 | Cho et al. | |
| 2008/0080463 A1* | 4/2008 | Stewart et al. | 370/342 |
| 2008/0285529 A1* | 11/2008 | Kwak et al. | 370/338 |
| 2009/0061864 A1* | 3/2009 | Sohn | 455/434 |
| 2009/0147757 A1* | 6/2009 | Naka et al. | 370/336 |
| 2009/0161652 A1* | 6/2009 | Chang et al. | 370/350 |
| 2009/0168662 A1* | 7/2009 | Tsuboi et al. | 370/252 |
| 2009/0185541 A1* | 7/2009 | Tanno et al. | 370/336 |
| 2009/0201565 A1* | 8/2009 | Bita et al. | 359/290 |
| 2009/0268695 A1* | 10/2009 | Zhao et al. | 370/336 |
| 2010/0002617 A1* | 1/2010 | Seyama | 370/312 |

FOREIGN PATENT DOCUMENTS

| | | |
|---|---|---|
| KR | 1020050003800 | 1/2005 |
| KR | 1020060026171 | 3/2006 |
| KR | 1020070077023 | 7/2007 |

* cited by examiner

*Primary Examiner* — Warner Wong
(74) *Attorney, Agent, or Firm* — The Farrell Law Firm, P.C.

(57) ABSTRACT

Disclosed is a method and an apparatus for transmitting a downlink Synchronization CHannel (SCH) in an Orthogonal Frequency Division Multiplexing (OFDM)-based cellular wireless communication system supporting a scalable bandwidth. Herein, initial cell search and neighbor cell search are seamlessly performed. The disclosed method and apparatus disclose a synchronization channel structure applicable to both a Frequency Division Duplex (FDD) system and a Time Division Duplex (TDD) system.

25 Claims, 11 Drawing Sheets

METHOD AND APPARATUS FOR TRANSMITTING/RECEIVING DOWNLINK SYNCHRONIZATION CHANNELS IN A CELLULAR COMMUNICATION SYSTEM SUPPORTING SCALABLE BANDWIDTH

PRIORITY

This application claims priority under 35 U.S.C. §119(a) to an application entitled "Method And Apparatus For Transmitting/Receiving Downlink Synchronization Channels In A Cellular Communication System Supporting Scalable Bandwidth" filed in the Korean Industrial Property Office on Oct. 2, 2006 and assigned Serial No. 2006-97352, the contents of which are incorporated herein by reference.

BACKGROUND OF THE INVENTION

1. Field of the Invention

The present invention relates generally to a cellular wireless communication system, and more particularly to a method and an apparatus for transmitting/receiving a DownLink (DL) Synchronization CHannel (SCH) for initial cell search and neighbor cell search.

2. Description of the Related Art

Recently, Orthogonal Frequency Division Multiplexing (OFDM) technology has being widely used in conjunction with broadcast and mobile communication technology. The OFDM technology eliminates interference between multipath signals in wireless communication channels, guarantees the orthogonality between multiple access users, and enables efficient use of frequency resources. Therefore, OFDM technology is more useful in high speed data transmission and for a broadband system, as opposed to the Direct Sequence Code Division Multiple Access (DS-CDMA) technology, such as the Wideband Code Division Multiple Access (WCDMA) or CDMA2000.

Figure 1:
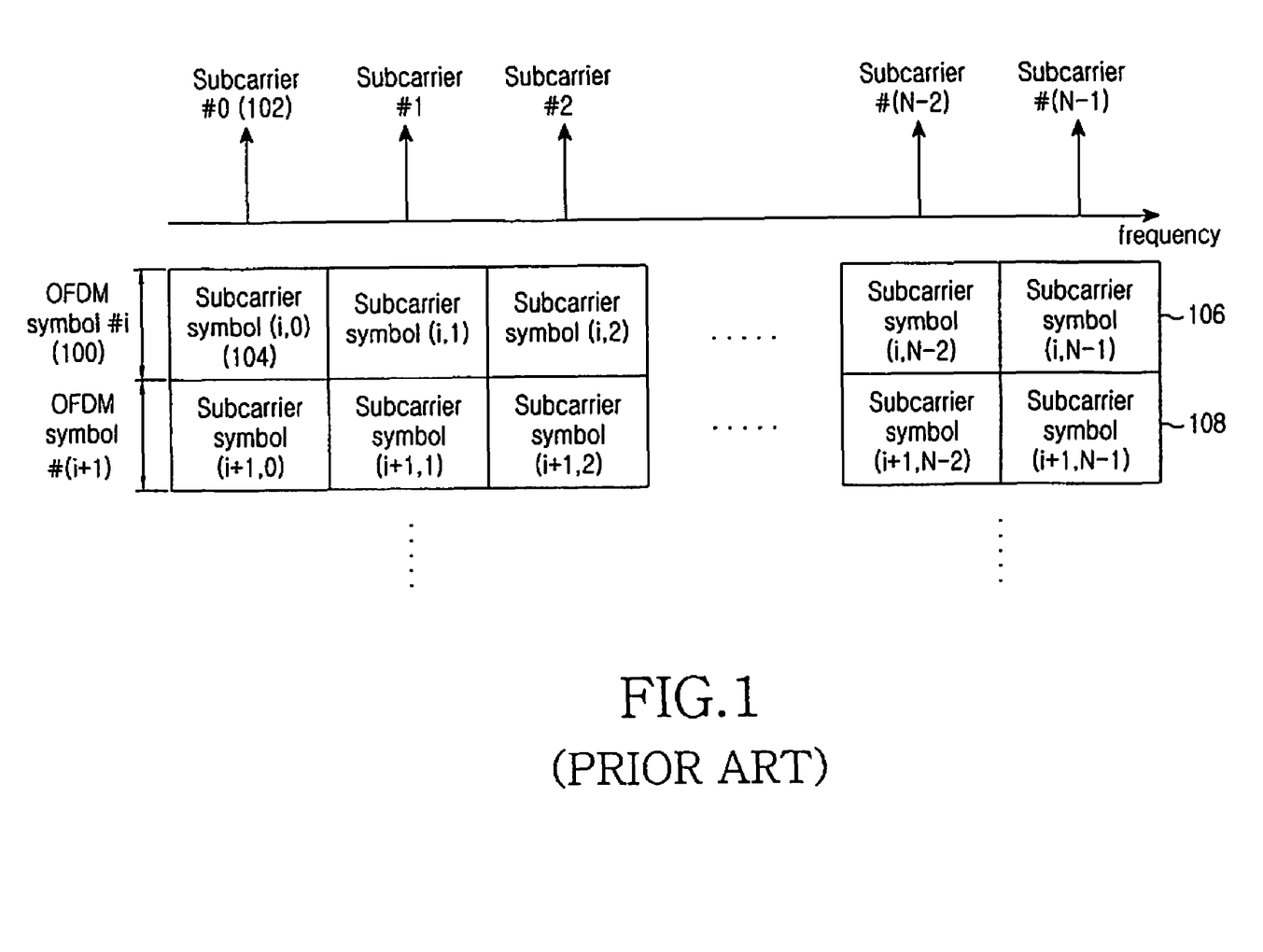
FIG. 1 illustrates a structure of a conventional SCH.

FIG. 1 illustrates a structure of a conventional OFDM signal in the time and frequency domain.

Referring to FIG. 1, one OFDM symbol 100 occupies N sub-carriers 102 in the frequency domain. Each sub-carrier 102 carries an individual modulation symbol 104 for transmission information, and the sub-carriers 102 carrying the modulation symbols 104 are simultaneously transmitted in parallel. Each modulation symbol 104 carried by the sub-carrier 102 is called a "sub-carrier symbol." As described above, the OFDM technology is multi-carrier transmitting technology, which can transmit data and control channel information through multiple sub-carriers. In FIG. 1, reference numerals 106 and 108 denote the $i^{th}$ and $(i+1)^{th}$ OFDM symbol intervals, respectively. In an OFDM-based communication system, each physical channel includes one or more sub-carrier symbols 104.

An important attribute of an OFDM-based cellular wireless communication system for providing a high speed wireless data service is the ability to support a scalable bandwidth. A system based on a scalable bandwidth can selectively use various bandwidths such as 20/15/10/5/2.5/1.25 megahertz (MHz). In such a system, a service provider can select one of the above-enumerated bandwidths in providing service in each cell, and there may exist various types of User Equipments (UEs) from a UE supporting a maximum of 20 MHz bandwidth to a UE supporting a minimum of 1.25 MHz bandwidth in each cell.

In a scalable bandwidth-based system, it is required of a UE initially accessing the system to be able to successfully search the cells, even though the UE is not aware of the system bandwidth. Through the cell search, the UE acquires a cell IDentifier (ID) and synchronization between a receiver and a transmitter for demodulation of data and control information. It is possible to acquire the system bandwidth either from an SCH during the cell search or through decoding of a Broadcast CHannel (BCH), which is a common control channel for transmission of system information after the cell search.

The BCH is a channel for transmitting system information of a cell that a UE accesses, and is demodulated after the UE terminates the cell search. The UE first performs the cell search through the SCH, and acquires system information of the cell by receiving the BCH after a successful cell search. By reading the BCH, the UE can obtain system information necessary for reception of data channels and other control channels, such as a cell ID of each cell, a system bandwidth and channel setup information.

Figure 2:
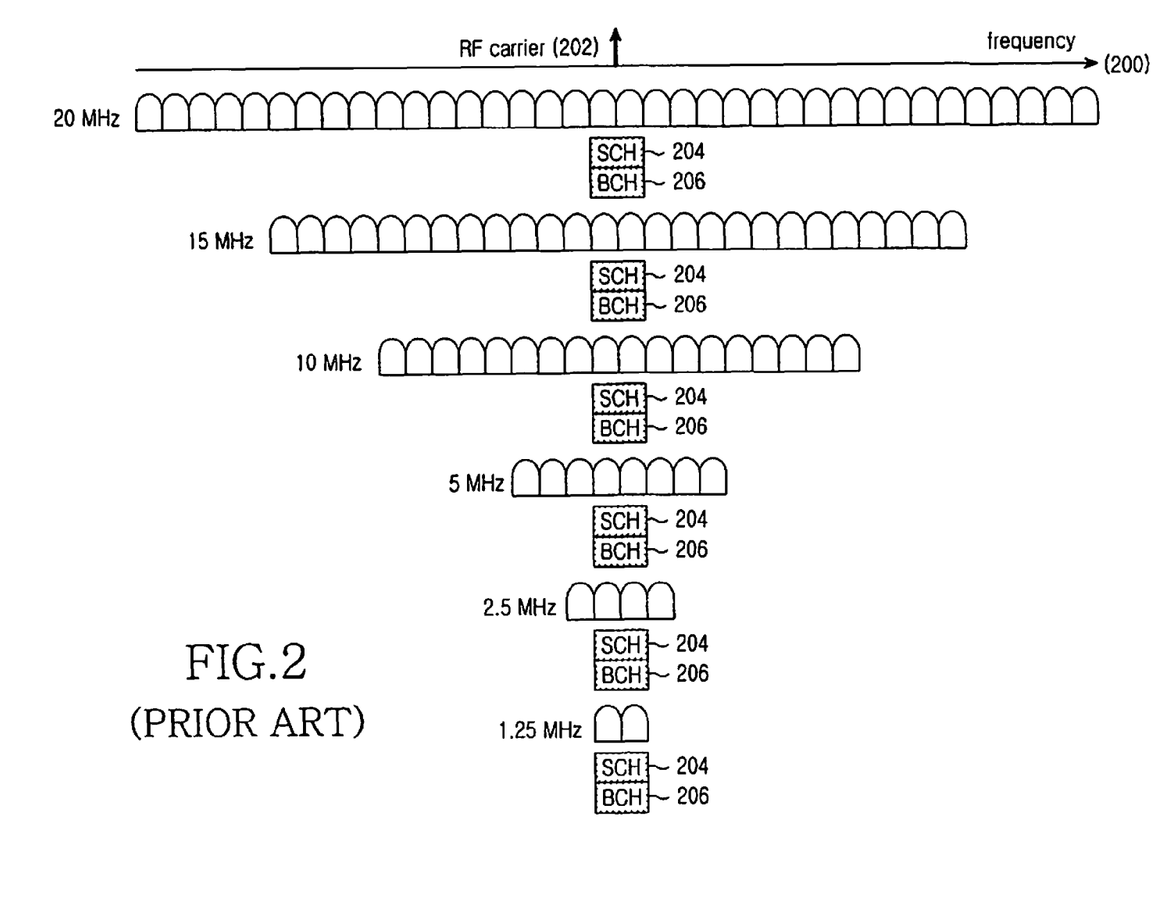
FIG. 2 illustrates conventional frequency resource mapping of a BCH and an SCH based on a system bandwidth in a system supporting a scalable bandwidth.

FIG. 2 illustrates a conventional frequency resource mapping of a BCH and an SCH based on a system bandwidth in a system supporting a scalable bandwidth.

Referring to FIG. 2, the horizontal axis 200 represents the frequency, and the SCH 204 and the BCH 206 are transmitted with a bandwidth of 1.25 MHz regardless of the system bandwidth in the middle of the system bandwidth. Therefore, the UE searches for a Radio Frequency (RF) sub-carrier 202 occupying a central frequency of the system bandwidth regardless of the size of the system bandwidth, and performs cell search based on the SCH 204 for a band of 1.25 MHz centering the RF sub-carrier 202, thereby acquiring initial synchronization. Further, after the cell search, the UE decodes the BCH 206 transmitted in the same 1.25 MHz band, thereby obtaining system information.

An important technical object in a system supporting a scalable bandwidth is to design the channels such that a UE having a bandwidth smaller than the system bandwidth can flawlessly perform BCH reception and cell search by the SCH from neighbor cells, even when the UE uses a service through only a part of the system bandwidth.

Various UEs having different bandwidth-supporting capabilities may exist within a system supporting a scalable bandwidth. For example, FIG. 3 illustrates an example of distribution of UEs 310 to 320 having a reception bandwidth of 10 MHz or 20 MHz in an active mode or idle mode within the system bandwidth.

Figure 3:
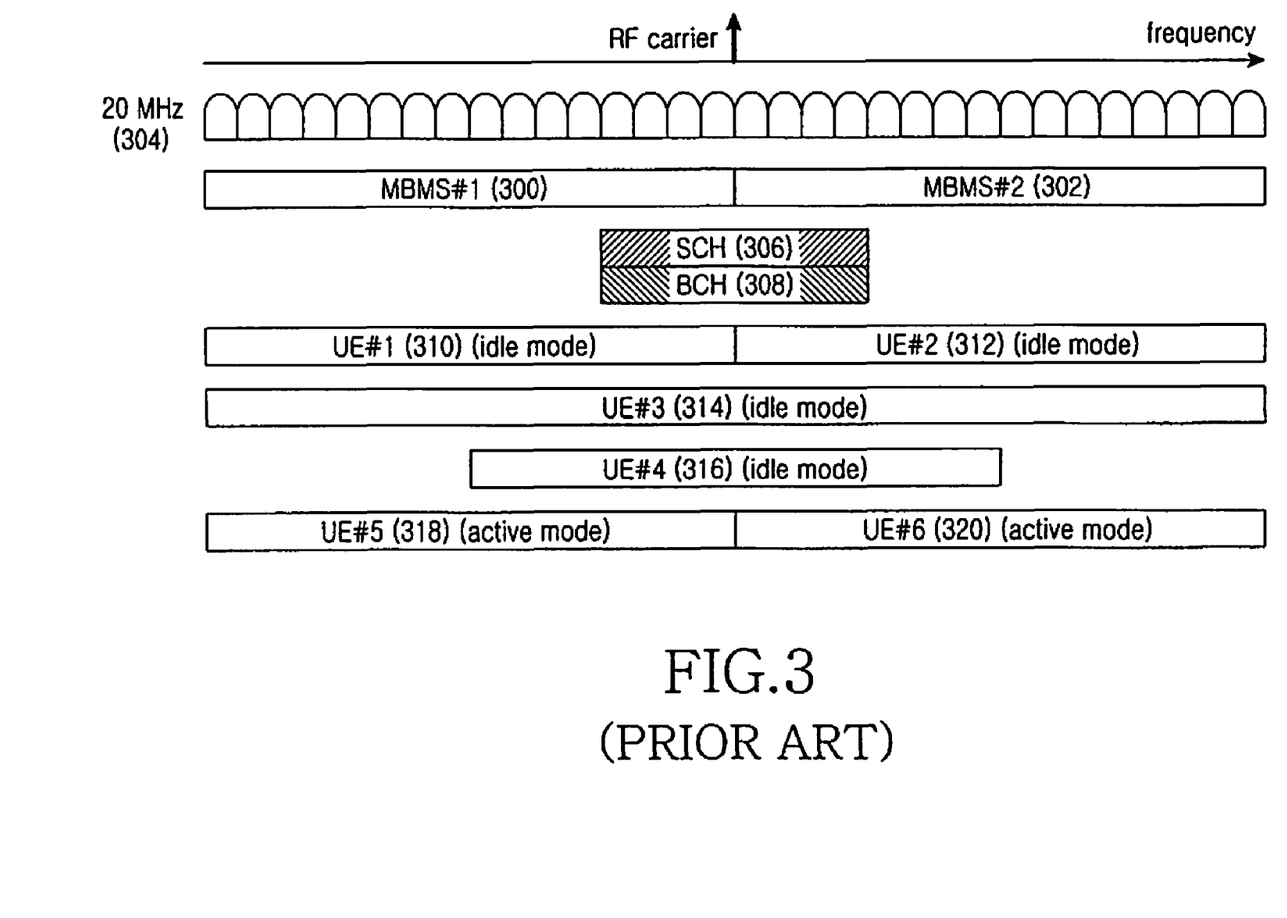
FIG. 3 illustrates conventional distribution of UEs having a reception bandwidth of 10 MHz or 20 MHz in an active mode or idle mode within the system bandwidth.

Referring to FIG. 3, when a minimum reception bandwidth of UEs 310 to 320 capable of accessing the system is 10 MHz, MBMS #1 300 and MBMS #2 302, which are Multimedia Broadcast Multicast Service (MBMS) physical channels, are transmitted in each 10 MHz band within the 20 MHz system band 304. The MBMS channels 300 and 302 are channels for providing a service to multiple users in a single direction through broadcast or multicast, and various broadcast services are provided through the MBMS #1 300 and the MBMS #2 302. Further, the SCH 306 and the BCH 308 are transmitted in the central band centering the RF sub-carrier frequency.

The UE #3 314, which has a minimum bandwidth of 20 MHz and is in the idle mode, can normally receive both the MBMS channels 300 and 302 and the SCH 306 and BCH 308. Further, the UE #4 316, which does not receive the MBMS service and is in the idle mode, occupies a central 10 MHz band of the system band and continuously receives the SCH 306 and the BCH 308 from neighbor cells, so as to perform cell search and system information reception in preparation for entering into the active mode.

In contrast, the UE #1 310 and the UE #2 312, each of which has a reception capability of 10 MHz bandwidth, receive MBMS channels 300 and 302 in the upper and lower half bands including the broadcast channels, respectively.

Because the UE #1 310 and the UE #2 312 are also in the idle mode, they also, like the UE #4 316, need to receive not only the MBMS data but also the SCH 306 and the BCH 308 from neighbor cells, in preparation for entering into the active mode. However, each of the UE #1 310 and the UE #2 312 receives only a part of the SCH 306 and only a part of the BCH 308. With the SCH 306, it is possible to perform the cell search by using only a sequence of a part of the band of the SCH 306. However, with the BCH 308, it is impossible to normally decode the system information without receiving all sub-carrier symbols of the band of the BCH 308. Likewise, the UE #5 318 and the UE #6 320, which are in the active mode in the upper and lower half bands, have the same problem.

In order to enable a normal decoding of the BCH 308, each of the UE #1 310 and the UE #2 312 needs to change its own reception RF frequency to the band (BCH transmission band) in which the BCH 308 is transmitted, receive the BCH 308, and then recover its original half band in which the MBMS channels 300 or 302 are transmitted. However, during such a process, it is difficult to achieve seamless reception of the MBMS data and cell search. Therefore, it is necessary to design the SCH and the BCH which enable UEs to smoothly move between cells without changing the reception RF frequency.

Particularly, a cellular communication system can operate in a Frequency Division Duplex (FDD) mode and a Time Division Duplex (TDD) mode. Therefore, there is a need for a downlink synchronization channel structure, which can be applied to both the FDD and the TDD and enables a UE to seamlessly perform initial cell search and neighbor cell search.

SUMMARY OF THE INVENTION

Accordingly, the present invention has been made to solve the above-mentioned problems occurring in the prior art, and the present invention provides a method and an apparatus which enable a UE to seamlessly perform initial cell search and neighbor cell search in a system supporting scalability of a system bandwidth and a UE reception bandwidth.

The present invention provides a method and an apparatus for transmitting/receiving a downlink SCH for acquiring downlink synchronization in both a TDD system and an FDD system in a situation in which systems and UEs having various bandwidths exist.

The present invention provides a method and an apparatus for overcoming the problem when a UE cannot perform a normal cell search in a cell boundary area due to insufficient transmission power of SCH sequences because of a limitation in the maximum transmission power of a node B when the SCH sequences are simultaneously transmitted in a maximum system bandwidth.

The present invention provides a method and an apparatus for smoothly acquiring downlink synchronization in a system in which the interval between OFDM symbols within a sub-frame changes according to the transmission mode because the system supports both unicast and multicast service.

In accordance with the present invention, there is provided a method for transmitting a downlink SCH in a cellular communication system supporting a scalable system bandwidth and using multiple access technology, the method including transmitting a first SCH sequence used for acquisition of downlink synchronization after mapping the first SCH sequence to a central band having an SCH transmission bandwidth centering on a central frequency of a system bandwidth in a first sub-frame of a first Transmission Time Interval (TTI) that is selected from among multiple TTIs constituting a frame, and transmitting a second SCH sequence used for acquisition of downlink synchronization after mapping the second SCH sequence to at least one of a first transmission band and a second transmission band, each of which has the SCH transmission bandwidth, in a second sub-frame following the first sub-frame within the first TTI, the first and second transmission bands being located within useful bands of both sides adjacent to the central frequency, respectively, each of the useful bands having a minimum reception bandwidth supportable by UEs within a cell.

In accordance with the present invention, there is provided a method for receiving a downlink SCH in a cellular communication system supporting a scalable system bandwidth and using multiple access technology, the method including determining whether the UE is camping at a center of a system band, when a bandwidth of the system band is larger than or equal to twice a reception bandwidth usable by the UE, detecting a first SCH sequence for acquisition of downlink synchronization through a central band having an SCH transmission bandwidth centering a central frequency of the system band, when the UE is camping at the center of the system band, determining a start point of a first sub-frame, to which the first SCH sequence belongs, as a start point of a frame, detecting a second SCH sequence for acquisition of downlink synchronization through one of a first transmission band and a second transmission band, when the UE is not camping at the center of the system band, each of the first and second transmission bands having the SCH transmission bandwidth and being located within useful bands of both sides adjacent to the central frequency, each of the useful bands having the reception bandwidth, and determining a start point of a previous sub-frame of a second sub-frame, to which the second SCH sequence belongs, as the start point of the frame.

In accordance with the present invention, there is provided an apparatus for transmitting and receiving a downlink SCH in a cellular communication system supporting a scalable system bandwidth and using multiple access technology, the apparatus including a node B for transmitting a first SCH sequence used for acquisition of downlink synchronization after mapping the first SCH sequence to a central band having an SCH transmission bandwidth centering on a central frequency of a system bandwidth in a first sub-frame of a first TTI that is selected from among multiple TTIs constituting a frame, and then transmitting a second SCH sequence used for acquisition of downlink synchronization after mapping the second SCH sequence to at least one of a first transmission band and a second transmission band, each of which has the SCH transmission bandwidth, in a second sub-frame following the first sub-frame within the first TTI, the first and second transmission bands being located within useful bands of both sides adjacent to the central frequency, respectively, each of the useful bands having a minimum reception bandwidth supportable by UEs within a cell, and a UE for detecting at least one of the first SCH sequence and the second SCH sequence for the downlink synchronization.

In accordance with the present invention, there is provided an apparatus for receiving a downlink SCH in a cellular communication system supporting a scalable system bandwidth and using multiple access technology, the apparatus including a node B for transmitting a first SCH sequence and a second SCH sequence for acquisition of downlink synchronization, and a UE for determining whether the UE is camping at a center of a system band, when a bandwidth of the system band is larger than or equal to a double of a reception bandwidth usable by the UE, wherein the UE detects a first SCH sequence for acquisition of downlink synchronization through a central band having a an SCH transmission bandwidth centering a central frequency of the system band when the UE is camping at the center of the system band, and determines a start point of a first sub-frame, to which the first SCH sequence belongs, as a start point of a frame, and the UE detects a second SCH sequence for acquisition of downlink synchronization through one of a first transmission band and a second transmission band, when the UE is not camping at a center of the system band, each of the first and second transmission bands having the SCH transmission bandwidth and determines a start point of a previous sub-frame of a second sub-frame, to which the second SCH sequence belongs, as the start point of the frame, the first and second transmission bands being located within useful bands of both sides adjacent to the central frequency, each of the useful bands having the reception bandwidth.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted for the sake of clarity and conciseness. Further, various specific definitions found in the following description are provided only to assist in the general understanding of the present invention, and it is apparent to those skilled in the art that the present invention can be implemented without such definitions.

A main goal of the present invention is to provide a method and an apparatus for transmitting/receiving a downlink synchronization channel (DL-SCH) in a cellular wireless communication system using multiplex access technology and supporting a scalable bandwidth. In a system based on the scalable bandwidth, both the system and each UE may have various bandwidths, such as 20/15/10/5/2.5/1.25 MHz, and UEs may have different bandwidth transmission/reception capabilities such as 10 MHz and 20 MHz. The present invention discloses a downlink synchronization channel structure, which can be seamlessly applied to both the FDD and the TDD, and enables a UE to perform initial cell search and neighbor cell search without a problem in a situation in which systems and UEs having various bandwidths exist.

The following description of the present invention mainly concerns an OFDM-based cellular wireless communication system, particularly the Evolved Universal Terrestrial Radio Access (E-UTRA) standard according to the Long Term Evolution (LTE) of the 3GPP. However, the present invention can be applied to other communication systems having similar technical backgrounds and channel types with slight modification without departing from the scope of the present invention, as appreciated by one skilled in the art.

Figure 4:
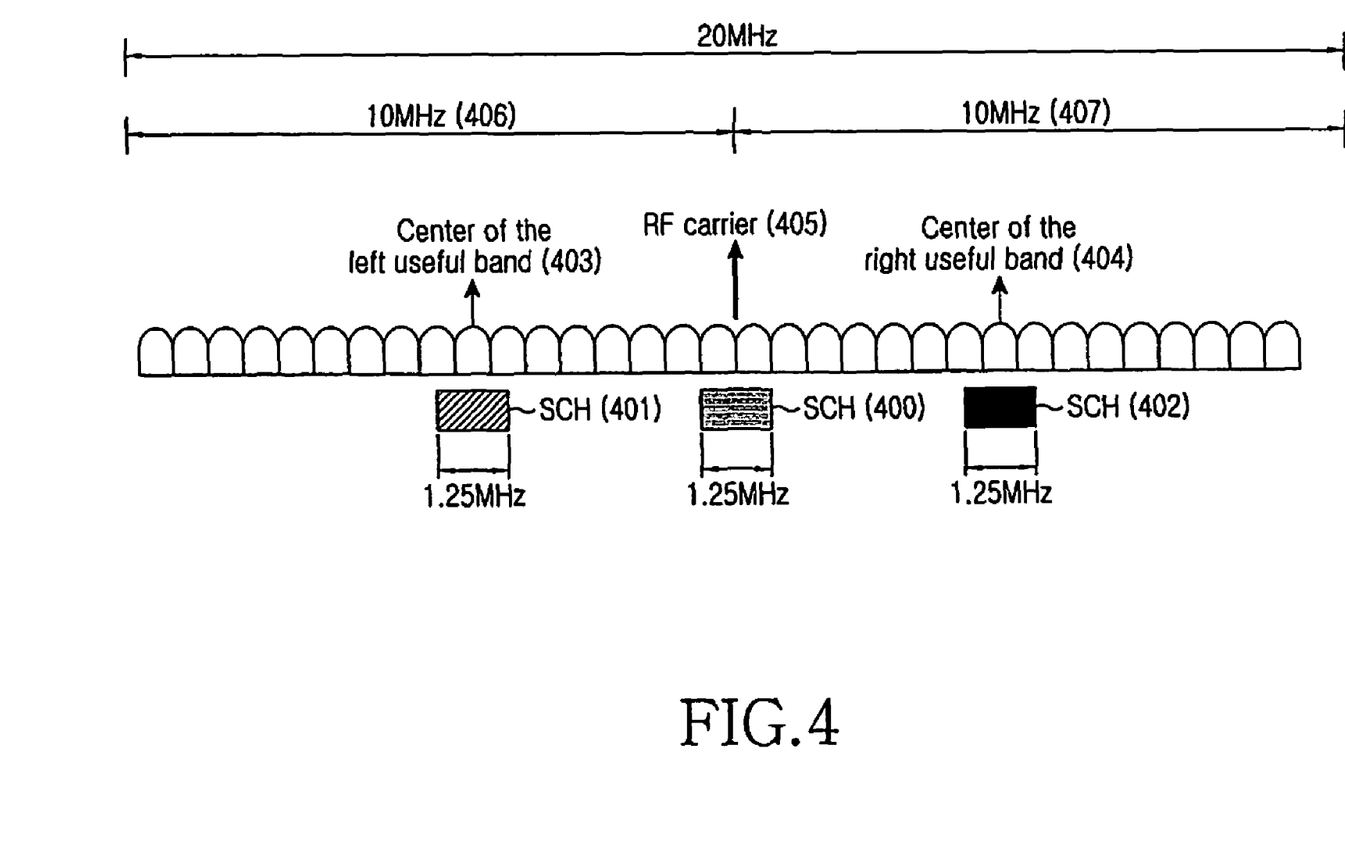
FIG. 4 illustrates frequency resource mapping of the SCH in a system supporting a scalable bandwidth.

FIG. 4 illustrates frequency resource mapping of the SCH in a system supporting a scalable bandwidth. The illustrated SCH structure enables UEs to perform normal cell search for a current cell and neighbor cells during movement of UEs between cells when 10 MHz and 20 MHz reception bandwidths are allowed for the UEs in a system having a bandwidth of 20 MHz.

Referring to FIG. 4, the SCH sequences (hereinafter, referred to as SCHs for simplicity) 400, 401 and 402 are transmitted each with a 1.25 MHz bandwidth at the center 405 of the entire system band and centers 403 and 404 of 10 MHz useful bands of both sides. The useful band refers to each 10 MHz band in which a useful sub-carrier is located. Usually, because parts near both ends of the entire system band are used as guard bands, a useful band has a size smaller than 10 MHz.

In FIG. 4, the SCH 400 is used for initial cell search by UEs, and the SCHs 401 and 402 are for cell search for neighbor cells by a UE having a reception bandwidth of 10 MHz, which is located in the left (i.e. lower) 10 MHz band 406 or the right (i.e. upper) 10 MHz band 408. In the illustrated SCH structure, regardless of wherever a 10 MHz UE camps from among the left and right 10 MHz bands 406 and 407 and the central band of the entire system band, the SCHs 400, 401 and 402 are respectively transmitted at centers of corresponding bands in which the UE camps, so that it is possible to achieve smooth cell search.

Specifically, the present invention discloses a mapping structure in a time domain of the SCH based on the frequency resource mapping structure of the SCH illustrated in FIG. 4. According to an important attribute of the present invention, the SCH sequences 400, 401 and 402, which camp at the center of the MHz system band, and centers of the 10 MHz bands 406 and 407 of both sides, respectively, as shown in FIG. 4, are transmitted at different sub-frames within the same TTI. As used herein, the SCH sequence refers to a synchronization sequence which is uncoded for using in cell search. The SCHs 400, 401 and 402 are repeatedly transmitted multiple times with a time interval within each 1.25 MHz band so that the SCHs can be searched by the same cell search algorithm. In other words, the first time points for transmission of the SCHs within the frame are respectively different in each 1.25 MHz band, but the time intervals between the SCHs transmitted within the frame are the same in the 1.25 MHz bands regardless of the 1.25 MHz bands.

Figure 5:
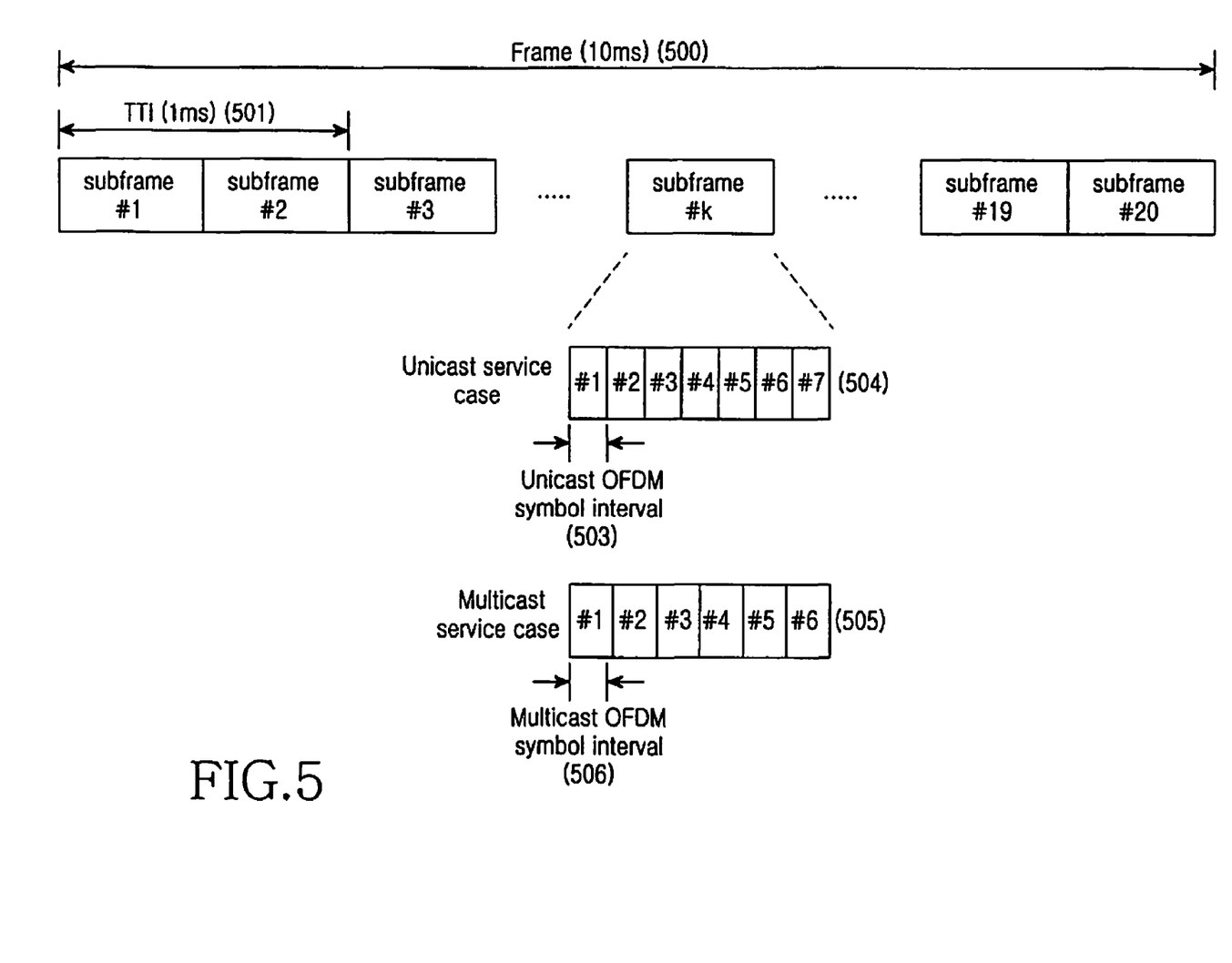
FIG. 5 illustrates a downlink frame structure considered in the Evolved Universal Terrestrial Radio Access (E-UTRA) standard of the $3^{rd}$ Generation Partnership Project (3GPP)

FIG. 5 illustrates a downlink frame structure considered in the E-UTRA standard of the 3GPP.

Referring to FIG. 5, one frame 500 has a length of 10 ms, and one frame 500 includes 20 sub-frames 502. Each of the sub-frames 502 includes 7 OFDM symbols 504 in a unicast service, and includes 6 OFDM symbols 505 in a multicast service. Therefore, the OFDM symbols have different symbol intervals 503 and 506 according to the type of the service applied to a corresponding sub-frame. Further, two sub-frames constitute one TTI 501 having a length of 1 ms.

The TTI corresponds to a temporal length of a channel-coded data packet block, and serves as a basic operation unit for Hybrid Automatic Repeat Request (HARQ) processes or scheduling of transmitted data packets. In an FDD system, all of the 10 TTIs within one frame can be used in downlink transmission. However, in a TDD system, TTIs are separately used for downlink transmission and uplink transmission, and the downlink sub-frames can be transmitted during only a part of the TTIs. At this time, the TTIs used for the downlink transmission constitute one Downlink Time Slot (DL TS), and the other TTIs used for the uplink transmission constitute one Uplink Time Slot (UL TS).

Hereinafter, particular embodiments of the present invention will be described in detail. The following description is based on an example in which a minimum allowed reception bandwidth of a UE is 10 MHz in the system bandwidth and a transmission bandwidth of each SCH is 1.25 MHz regardless of the system bandwidth. Specifically, mapping in the time domain of the SCH in the system bandwidth of 20 MHz is described. However, it should be noted that the specific numerical values described herein do not define the scope of the invention.

1$^{st}$ Embodiment

Figure 6:
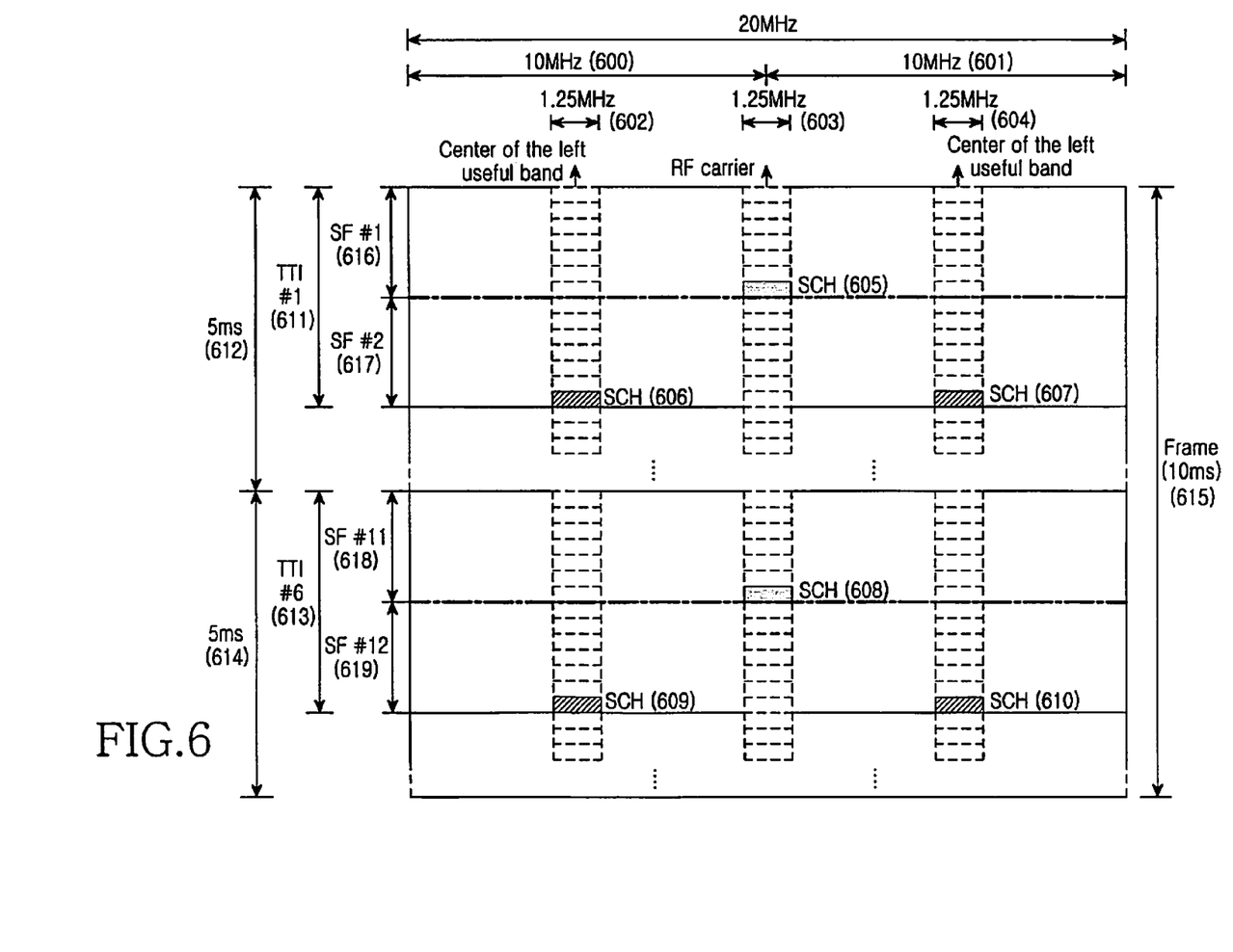
FIG. 6 illustrates a structure of an SCH according to the first embodiment of the present invention.

FIG. 6 illustrates an SCH according to the first embodiment of the present invention.

Referring to FIG. 6, in a central 1.25 MHz band 603 of the 20 MHz system band, the SCH is transmitted at the last OFDM symbols 605 and 608 of the Sub-Frame (SF) #1 616 and the sub-frame #11 618 within the 10 ms frame 615. Further, at the central 1.25 MHz bands 602 and 604 of the side 10 MHz bands 600 and 601, the SCH is transmitted at the last OFDM symbols 606 and 609 of the Sub-Frame #2 617 and at the last OFDM symbols 607 and 610 of the sub-frame #12 619. Therefore, in each of the 1.25 MHz bands 602, 603 and 604, two SCHs are transmitted within the 10 ms frame. The SCHs 605 to 610 as described above may be either the same sequence or different sequences. Even when the SCHs transmitted in the respective 1.25 MHz ands 602, 603 and 604 have specific sequence indexes different from each other, the sequences have the same structure so that a UE can detect a corresponding sequence with the same cell search algorithm. Because the pairs of SCHs 606 and 609, 605 and 608, or 607 and 610 have the same interval of 5 ms between them in each of the 1.25 MHz bands 602, 603 and 604, a UE can detect the SCHs by applying the same cell search algorithm regardless of the band in which the UE currently camps. Therefore, the UE can reduce the operation complexity of the cell search of the UE and the complexity in implementing the cell searcher.

As noted from the SCH structure of FIG. 6, by transmitting the SCH 605 and the SCHs 606 and 607 in the TTI 611 and by transmitting the SCH 608 and the SCHs 609 and 610 in the TTI 613, it is possible to enable a transmitted downlink TTI to always have an SCH in a TDD-based system. In a TDD-based system, the frame 615 is divided into uplink and downlink time slots. Therefore, if the SCHs 605, 606 and 607 are transmitted in different TTIs, all the TTIs including the SCHs 605, 606 and 607 should be used as downlink time slots. In the SCH structure shown in FIG. 6, the system always uses the TTI #1 611 and the TTI #6 613 as downlink time slots, and all the SCHs 605 to 610 within the frame can be always transmitted, so that the UEs can easily perform the cell search. As a result, neighbor cell search in a E-UTRA system is facilitated, and a UE accessing different types of systems, such as a Global System for Mobile Communications (GSM) and Wideband Code Division Multiple Access (WCDMA) system, can easily perform cell search for a system of the present invention.

According to another embodiment, the SCHs may be mapped to other TTIs than the TTI #1 611 and the TTI #6 613 within the frame 615. Further, the SCHs can be transmitted through one or more TTIs within one frame. According to still another embodiment, the SCHs 606 and 609 transmitted at the central band 602 of the left 10 MHz band may be transmitted in the same OFDM symbol interval as that of the SCHs 605 and 608 transmitted at the central band 602 of the 20 MHz system band, while the SCHs 607 and 610 transmitted at the central band 604 of the right 10 MHz band are transmitted as they are as shown in FIG. 6. According to a further embodiment, the SCHs 607 and 610 and the SCHs 605 and 608 may be transmitted in the same time interval, while the SCHs 606 and 609 are transmitted in another time interval. In other words, the SCHs of at least one half band from among the two 10 MHz bands 600 and 601 are transmitted at a symbol interval different from that of the SCHs of the central band.

According to another embodiment, the SCHs 606 and 607 or 609 and 610 of each side 10 MHz band may be transmitted at a 1.25 MHz band that is not a central band of the useful band of each side 10 MHz band. At this time, the location of the transmission band for the SCHs 606 and 607 or 609 within each side 10 MHz band is determined in advance by, for example, a system standard or a system designer's choice. Although the present specification describes that those channels are transmitted at the central part of each side 10 MHz band, it should be noted that it does not define the scope of the present invention. Further, the present invention can be also applied to a system bandwidth of more than 20 MHz.

Figure 7:
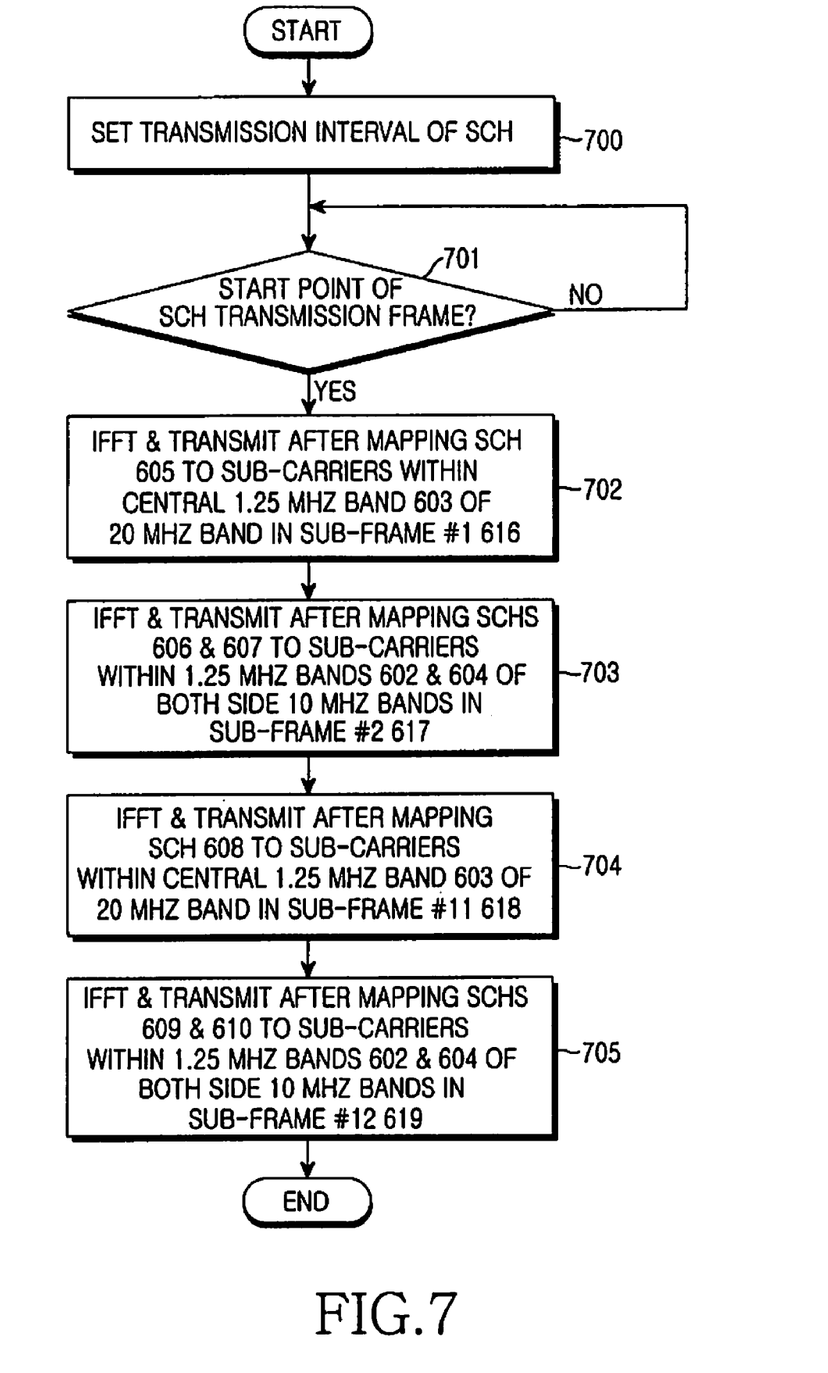
FIG. 7 illustrates a process of SCH transmission by a node B having a transmission bandwidth of 20 MHz according to the first embodiment of the present invention.

FIG. 7 illustrates a process of SCH transmission by a node B having a transmission bandwidth of 20 MHz according to the first embodiment of the present invention.

Referring to FIG. 7, a node B sets a transmission period for SCHs (step 700). For example, the SCH may be transmitted at each frame, and the transmission period of this case has a value of 10 ms. Then, the node B waits for a start point of a frame for transmission of the SCH according to the transmission period (step 701). When the start point is reached, at the last OFDM symbol interval of the sub-frame #1 616 of the corresponding frame, the SCH 605 is mapped to sub-carriers belonging to the central 1.25 MHz band 603 of the 20 MHz system band is then transmitted after Inverse Fast Fourier Transform (IFFT) (step 702). Thereafter, at the last OFDM symbol interval of the sub-frame #2 617, the SCHs 606 and 607 are mapped to sub-carriers belonging to the central 1.25 MHz bands 602 and 604 of the side 10 MHz bands 600 and 601 are then transmitted after IFFT (step 703). In the same manner, at the last OFDM symbol interval of the sub-frame #11 618 of a corresponding frame, the SCH 608 is mapped to sub-carriers belonging to the central 1.25 MHz band 603 of the 20 MHz system band is then transmitted after IFFT (step 704). Finally, at the last OFDM symbol interval of the sub-frame #12 619, the SCHs 609 and 610 are mapped to sub-carrier symbols belonging to the central 1.25 MHz bands 602 and 604 of the side 10 MHz bands 600 and 601 are then transmitted after IFFT (step 705).

Figure 8:
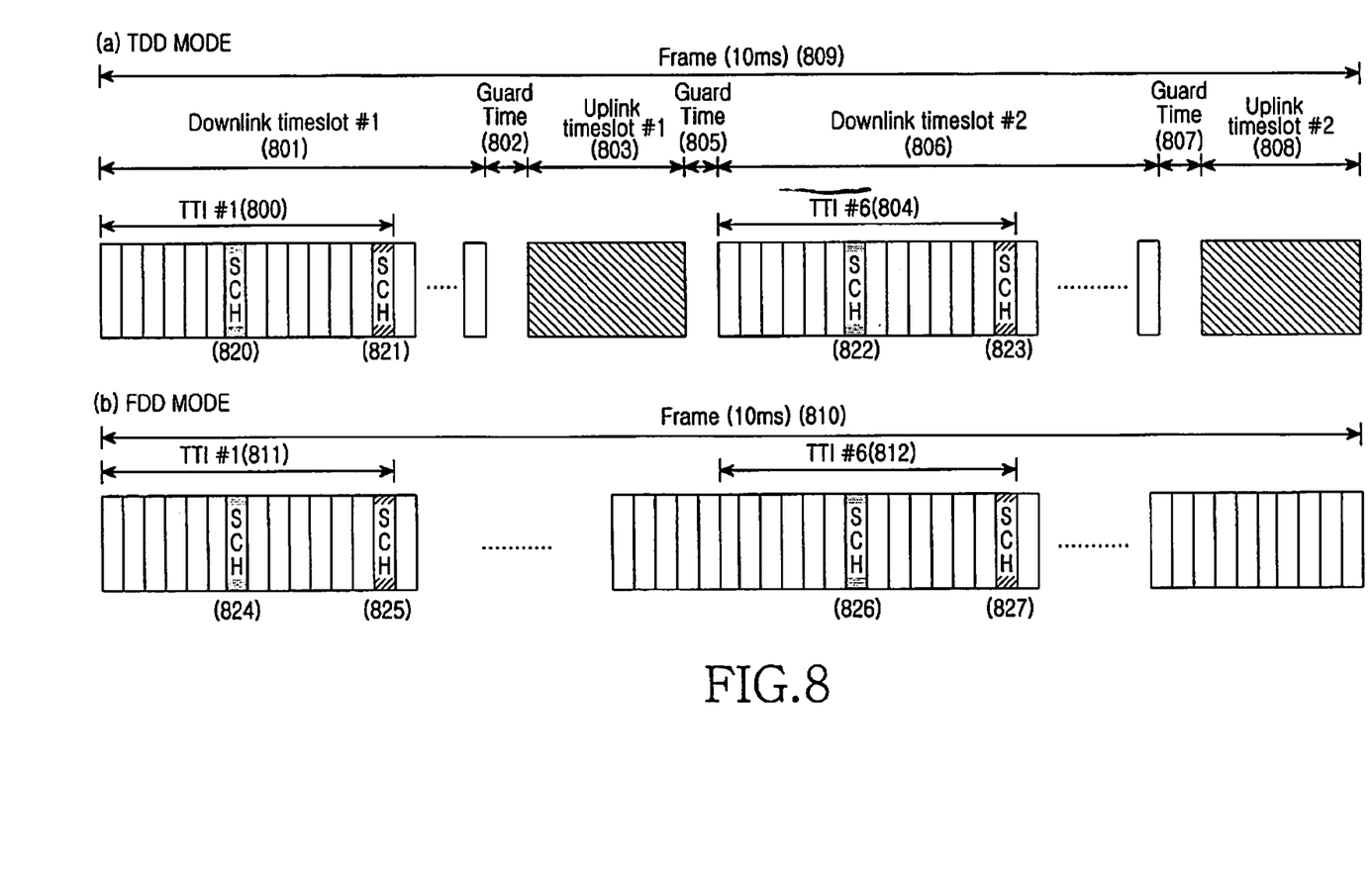
FIG. 8 illustrates application of the SCH structure according to the first embodiment of the present invention to the TDD transmission mode and the FDD transmission mode, respectively.

FIG. 8 illustrates an application of the SCH structure according to the first embodiment of the present invention to the TDD transmission mode and the FDD transmission mode, respectively.

FIG. 8, section (a) corresponds to the TDD transmission mode in which uplink transmission and downlink transmission are performed in different time slots. One frame 809 is divided into four time slots 801, 803, 806 and 808, wherein the first and third time slots 801 and 806 are for the downlink transmission and the second and fourth time slots 803 and 808 are for the uplink transmission. Also, the frame 809 includes guard intervals 802, 805 and 807, which are inserted between the time slots 801, 803, 806 and 808 one guard interval between every two time slots. In the illustrated example, although a part of the time slots 803 and 808 within the frame 809 are allocated to the uplink, the TTI #1 800 and the TTI #6 804 belong to the downlink time slots 800 and 806. Therefore, all of the SCHs 820, 822, 821, and 823 of the central band of the system band and of the side bands can be transmitted within one frame 809.

If the SCHs 820, 821, 822 and 823 of the central band of the system band and the side bands are transmitted at different TTIs, it is not easy to enable all the SCHs 820, 821, 822 and 823 within the frame 809 to be included in the downlink time slots and always transmitted as in section (a) of FIG. 8. FIG. 8, section (b) illustrates a downlink frame 810 in the FDD mode. Referring to FIG. 8, section (b), the SCHs 820, 821, 822 and 823 of the central band of the system band and the side bands are transmitted at the TTI #1 811 and the TTI #6 812 within one frame 810. In the FDD mode, the downlink transmission and the uplink transmission are simultaneously performed by using different bands. Therefore, differently from the TDD mode shown in FIG. 8, section (a), the SCH can be transmitted in any downlink sub-frame including the TTI #1 811 and the TTI #6 812.

Referring to FIG. 8, section (a), the SCHs 820 and 822 camping at the central band 603 of the 20 MHz system band are not simultaneously transmitted with the SCHs 821 and 823 camping at the central bands of the side 10 MHz bands 600 and 601. Therefore, the SCHs 820, 821, 822 and 823 within the 1.25 MHz bands 602, 603 and 604 are not simultaneously transmitted. The SCH is transmitted with high transmission power so that even a UE located at a cell boundary area can perform a smooth cell search. In the structure shown in FIG. 8, section (a), because the SCHs are not simultaneously transmitted, it is possible to avoid using high instant power due to simultaneous transmission of the SCHs by a node B. Therefore, it is possible to overcome the possibility of trouble in cell search at a cell boundary area due to limitation in maximum transmission power of a node B. Also, because each SCH is transmitted at the last OFDM symbol interval of a corresponding sub-frame, it is possible to avoid difficulty in acquisition of downlink synchronization due to a change in the length of each OFDM symbol 503 and 506 according to the service applied to the corresponding sub-frame as shown in FIG. 5. That is, the UE can perform acquisition of downlink synchronization for an interval based on an end point of each sub-frame.

Meanwhile, in this regard, when the first SCHs 605, 606 and 607 transmitted within each of the 1.25 MHz bands 602, 603 and 604 are located within the same sub-frame, it is possible to simultaneously overcome both the difficulty in acquisition of downlink synchronization due to change in the OFDM symbol length and the problematic cell search in the cell boundary area due to limitation in maximum transmission power of a node B. If all of the SCHs 605, 606 and 607 are located at the last OFDM symbol of the first sub-frame 616, a UE can easily acquire OFDM synchronization, but instant transmission power necessary for simultaneous transmission of the SCHs 605, 606 and 607 may exceed the maximum transmission power of a node and may prevent the cell search in the cell boundary area. Then, a normal cell search for neighbor cells may be impossible in a handover situation, so as to cause a problem in the mobility of a UE. Meanwhile, when the SCHs 605, 606 and 607 are transmitted at different OFDM symbol intervals within corresponding sub-frames, it may become difficult to acquire downlink synchronization due to the OFDM symbol length changing according to the service or different SCH structures and cell search algorithms may be applied according to the 1.25 MHz bands 602, 603 and 604.

Another advantage of the structure shown in FIG. 6 is that the SCHs 606 and 607 and the SCHs 609 and 610 camping at the central 1.25 MHz bands 602 and 604 of the side 10 MHz bands can be transmitted at the very next sub-frames of the sub-frames for transmission of the SCHs 605 and 608, so as to further reduce the time for acquisition of downlink synchronization of the UE having a reception bandwidth of 20 MHz. That is, when the UE having a reception bandwidth of 20 MHz has failed in detecting a cell ID while successfully performing a downlink synchronization acquisition from the SCH 605 or the SCH 608 transmitted at the center of the 20 MHz system band, the UE can try to detect a cell ID from the SCHs 609 and 610 or the SCHs 606 and 607 of the side 10 MHz bands transmitted at the very next sub-frame.

Figure 9:
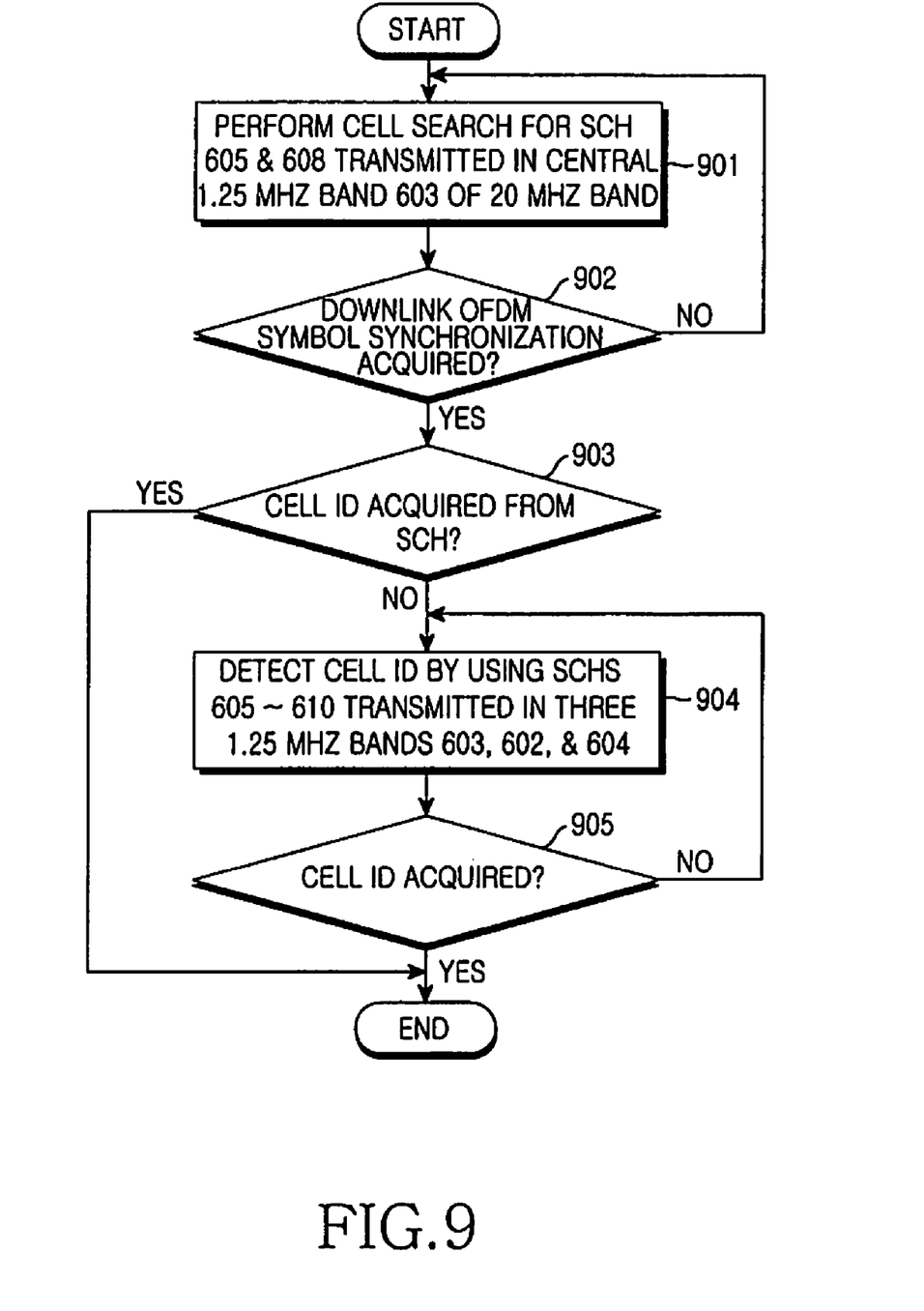
FIG. 9 illustrates an operation of cell search by a UE having reception bandwidth of 20 MHz according to the first embodiment of the present invention.

FIG. 9 illustrates an operation of cell search by a UE having reception bandwidth of 20 MHz according to the first embodiment of the present invention.

Referring to FIG. 9, regardless of whether the cell search is initial cell search or cell search for neighbor cells, the UE performs cell search by using the SCH 605 or 608 transmitted through the central 1.25 MHz band 603 of the 20 MHz system band (step 901), and then determines whether the UE has successfully acquired downlink OFDM symbol synchronization as a result of the cell search (step 902). When the UE has failed to successfully acquire downlink OFDM symbol synchronization from the SCH, the UE returns to step 901 in order to receive the SCH. When the UE has successfully acquired downlink OFDM symbol synchronization, the UE determines whether it has successfully acquired a cell ID from the SCH (step 903). When the UE has successfully acquired a cell ID from the SCH, the cell search is terminated. As used herein, the cell ID may correspond to at least one of a specific cell code, a cell group code and a cell ID value, which are transmitted through the SCH.

When the UE has successfully acquired downlink OFDM symbol synchronization but has failed to successfully acquire a cell ID from the SCH, the UE can detect sub-carrier symbols through Fast Fourier Transform (FFT) of a received signal by using the acquired downlink synchronization. Therefore, the UE performs detection of a cell ID through FFT for a reception signal of each band by using not only the SCH 605 or 608 but also the SCHs 606 and 607, or 609 and 610 transmitted through the central bands of the side 10 MHz bands (step 904). When the UE has successfully detected a cell ID by using all or some of the SCHs 605 to 610 (step 905), the cell search process is terminated. In contrast, when the UE has failed to successfully detect a cell ID by using all or some of the SCHs 605 to 610, the UE returns to step 904 in order to receive the SCHs 605 to 610.

Figure 10:
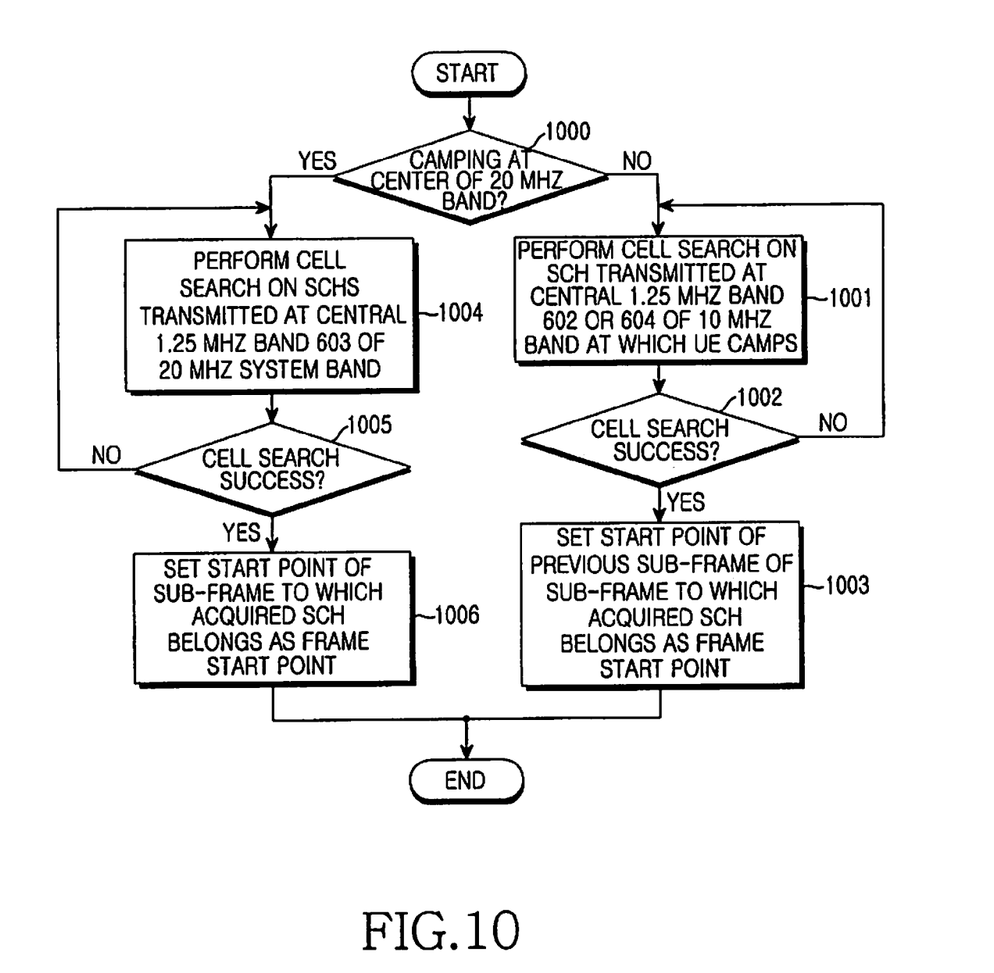
FIG. 10 illustrates a cell search operation of a UE having reception bandwidth of 10 MHz according to the first embodiment of the present invention.

FIG. 10 illustrates a cell search operation of a UE having reception bandwidth of 10 MHz according to the first embodiment of the present invention.

Referring to FIG. 10, the UE having reception bandwidth of 10 MHz determines whether the UE is camping at the central band 603 of the 20 MHz system band or the central band 602 or 604 of the left or right 10 MHz band (step 1000). When the UE is camping at the central band 603 of the 20 MHz system band, the UE performs cell search by the SCH 605 or 608 transmitted through the central 1.25 MHz band 603 of the 20 MHz system band (step 1004). When the UE has successfully performed the cell search by successfully acquiring downlink synchronization and a cell ID from the SCH (step 1005), the UE sets the start point of the first sub-frame to which the SCH belongs as a start point of the frame (step 1006) and then terminates the cell search. At this time, the UE can recognize whether the SCH is transmitted from the TTI #1 or the TTI #6 from the SCH itself or another means, and determines the start point of the frame based on the recognized information. In contrast, when the UE has failed in the cell search by the SCH, the UE returns to step 1004 in order to receive the SCH again.

Meanwhile, when the UE is camping at the central band 602 or 604 of one side 10 MHz band, the UE performs cell search by the SCH 606, 607, 609 or 610 transmitted through the central 1.25 MHz band 602 or 604 of the 10 MHz band at which the UE camps (step 1001). When the UE has made a success of the cell search by the SCH (step 1002), the UE sets the start point of a sub-frame just before the sub-frame to which the SCH belongs as a start point of the frame (step 1003) and then terminates the cell search. At this time, the UE can recognize whether the SCH is transmitted from the TTI #1 or the TTI #6 from the SCH itself or another means, and determines the start point of the frame based on the recognized information. In contrast, when the UE has failed in the cell search by the SCH, the UE returns to step 1001 in order to receive the SCH again.

2$^{nd}$ Embodiment

Figure 11:
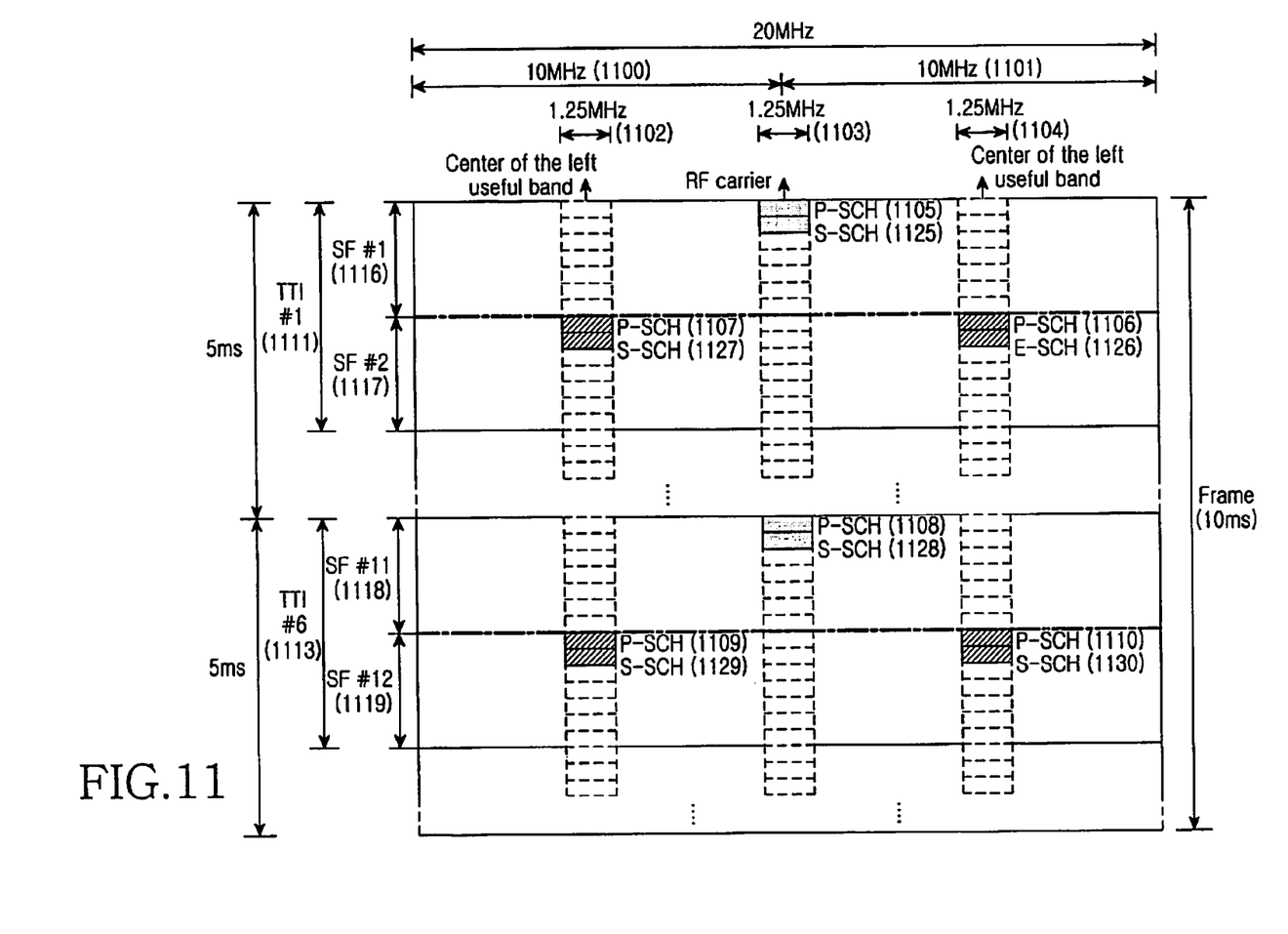
FIG. 11 illustrates a structure of an SCH according to the second embodiment of the present invention.

FIG. 11 illustrates an SCH according to the second embodiment of the present invention. The structure shown in FIG. 11 is different from the structure of FIG. 6 in that each SCH is divided into a Primary SCH (P-SCH) and a Secondary SCH (S-SCH), both of which being transmitted twice in the frame. For example, the P-SCH may be primarily used for acquisition of downlink synchronization and the S-SCH may be primarily used for detection of a cell ID. However, the present invention does not limit the use of the P-SCH and the S-SCH.

Referring to FIG. 11, during TTI #1 1111 or TTI #6 1113, the P-SCHs 1105 and 1108 and the S-SCHs 1125 and 1128 are transmitted in the central 1.25 MHz band 1103 of the 20 MHz system band, while the P-SCHs 1107 and 1109 or 1106 and 1110 and the S-SCHs 1127 and 1129 or 1126 and 1130 are transmitted in the central 1.25 MHz band 1102 or 1104 of the side 10 MHz band 1100 or 1101. Further, the SCHs 1105, 1108, 1125 and 1128 of the central 1.25 MHz band 1103, and the P-SCHs 1107, 1109, 1106 and 1110 and the S-SCHs 1127, 1129, 1126 and 1130 of the central 1.25 MHz bands 1102 and 1104 of both sides are transmitted at different sub-frames within each TTI 1111 or 1113. Therefore, as is in the structure shown in FIG. 6, the SCHs 1105 to 1110 and 1125 to 1130 can be easily transmitted also in the TDD mode, and the UE can apply the same cell search algorithm in each of the 1.25 MHz bands 1102, 1103 and 1104. Further, according to the second embodiment of the present invention, the SCHs are transmitted in the first and second symbol intervals of each sub-frame.

The operation of a UE illustrated in FIGS. 9 and 10 can also be applied to the second embodiment of the present invention. However, in step 904, the S-SCHs 1125 to 1130 are used for detection of a cell ID. Further, since the P-SCHs 1105 to 1110 and the S-SCHs 1125 to 1130 are transmitted through adjacent OFDM symbols, a preliminary guarantee that the sub-frame structure 504 or 505 of FIG. 5 is applied to the TTI #1 1111 and the TTI #6 1113 for transmission of the P-SCHs 1105 to 1110 and the S-SCHs 1125 to 1130 may be necessary between a node B and a UE. If a dynamic application of the sub-frame structure is allowed and the OFDM symbol has a variable length, a UE may fail to recognize an exact start point of the OFDM symbol transmitting the S-SCHs 1125 to 1130 after acquiring the downlink synchronization. Therefore, according to a preferred embodiment of the present invention, the SCH structure and a cell search operation of a UE can be simplified by applying a particular sub-frame structure (e.g., the structure 504 or 505) to TTI #1 1111 and TTI #6 1113 of FIG. 11. By using the sub-frame structure, it may become easier to multiplex TTI #1 1111 and TTI #6 1113 with the BCH and then transmit the multiplexed channels.

A temporal mapping structure of an SCH according to the present invention is easily applicable commonly to both a TDD system and an FDD system, and fully supports both the inter-Radio Access Technology (RAT) handover and the inter-cell handover within a system. The present invention easily enables all SCH sequences to be transmitted always in downlink time slots in a TDD system. Further, the present invention overcomes the problem of excessive instant transmission power of a node B, which may occur when three SCH sequences are simultaneously transmitted within one TTI.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for transmitting a downlink Synchronization CHannel (SCH) in a cellular communication system supporting a scalable system bandwidth and using multiple access technology, the method comprising the steps of:

transmitting a first SCH sequence used for acquisition of downlink synchronization after mapping the first SCH sequence to a central band having an SCH transmission bandwidth centering on a central frequency of a system bandwidth in a first sub-frame of a first Transmission Time Interval (TTI) that is selected from among multiple TTIs constituting a frame; and transmitting a second SCH sequence used for acquisition of downlink synchronization after mapping the second SCH sequence to at least one of a first transmission band and a second transmission band, each of which has the SCH transmission bandwidth, in a second sub-frame following the first sub-frame within the first TTI, the first and second transmission bands being located within useful bands of opposite sides adjacent to the central frequency, respectively, each of the useful bands having a minimum reception bandwidth supportable by User Equipments (UEs) within a cell.

2. The method as claimed in claim 1, further comprising:
transmitting the first SCH sequence after mapping the first SCH sequence to the central band in a third sub-frame of a second TTI located after a time interval from the first TTI within the frame; and
transmitting the second SCH sequence after mapping the second SCH sequence to at least one of the first transmission band and the second transmission band in a fourth sub-frame following the third sub-frame within the second TTI.

3. The method as claimed in claim 1, wherein each of the first and second SCH sequences is transmitted in a last symbol interval of the corresponding sub-frame.

4. The method as claimed in claim 1, wherein each of the first SCH and second SCH sequences includes a Primary SCH (P-SCH) sequence and a Secondary SCH (S-SCH) sequence, the P-SCH sequence being transmitted in a first symbol interval of each of the first and second sub-frames and the S-SCH sequence being transmitted in a second symbol interval of each of the first and second sub-frames.

5. The method as claimed in claim 1, further comprising transmitting the second SCH sequence after mapping the second SCH sequence to one of the first and second transmission bands in the first sub-frame of the first TTI.

6. A method for receiving a downlink Synchronization CHannel (SCH) in a cellular communication system supporting a scalable system bandwidth and using multiple access technology, the method comprising the steps of:
determining whether a User Equipment (UE) is camping at a center of a system band, when a bandwidth of the system band is larger than or equal to twice a reception bandwidth usable by the UE;
detecting a first SCH sequence for acquisition of downlink synchronization through a central band having an SCH transmission bandwidth centering a central frequency of the system band, when the UE is camping at the center of the system band;
determining a start point of a first sub-frame, to which the first SCH sequence belongs, as a start point of a frame;
detecting a second SCH sequence for acquisition of downlink synchronization through one of a first transmission band and a second transmission band, when the UE is not camping at the center of the system band, each of the first and second transmission bands having the SCH transmission bandwidth and being located within useful bands of both sides adjacent to the central frequency, each of the useful bands having the minimum reception bandwidth; and
determining a start point of a previous sub-frame of a second sub-frame, to which the second SCH sequence belongs, as the start point of the frame.

7. The method as claimed in claim 6, wherein:
the first SCH sequence is transmitted through the central band in a first sub-frame of a first Transmission Time Interval (TTI) selected from among multiple TTIs constituting a frame and a third sub-frame of a second TTI located after a time interval from the first TTI within the frame; and
the second SCH sequence is transmitted through at least one of the first and second transmission bands in a second sub-frame following the first sub-frame within the first TTI and a fourth sub-frame following the third sub-frame within the second TTI.

8. The method as claimed in claim 6, further comprising:
acquiring downlink synchronization by detecting the first SCH sequence through the central band, when the bandwidth of the system band is smaller than twice the reception bandwidth;
detecting the second SCH sequence through at least one of the first and second transmission bands, when the UE has failed to detect a cell Identifier (ID) from the first SCH sequence; and
acquiring the cell ID by using at least one of the first and second SCH sequences.

9. The method as claimed in claim 6, wherein each of the first and second SCH sequences is transmitted in a last symbol interval of the corresponding sub-frame.

10. The method as claimed in claim 6, wherein each of the first and second SCH sequences includes a Primary SCH (P-SCH) sequence and a Secondary SCH (S-SCH) sequence, the P-SCH sequence being transmitted in a first symbol interval of each of the first and second sub-frames and the S-SCH sequence being transmitted in a second symbol interval of each of the first and second sub-frames.

11. The method as claimed in claim 6, wherein the second SCH sequence is transmitted through one of the first and second transmission bands in the first sub-frame of the first TTI.

12. The method as claimed in claim 6, wherein the first and second transmission bands are located at centers of the useful bands of both sides, respectively.

13. An apparatus for transmitting and receiving a downlink Synchronization CHannel (SCH) in a cellular communication system supporting a scalable system bandwidth and using multiple access technology, the apparatus comprising:
a node B for transmitting a first SCH sequence used for acquisition of downlink synchronization after mapping the first SCH sequence to a central band having an SCH transmission bandwidth centering on a central frequency of a system bandwidth in a first sub-frame of a first Transmission Time Interval (TTI) that is selected from among multiple TTIs constituting a frame, and then transmitting a second SCH sequence used for acquisition of downlink synchronization after mapping the second SCH sequence to at least one of a first transmission band and a second transmission band, each of which has the SCH transmission bandwidth, in a second sub-frame following the first sub-frame within the first TTI, the first and second transmission bands being located within useful bands of opposite sides adjacent to the central frequency, respectively, each of the useful bands having a minimum reception bandwidth supportable by User Equipments (UEs) within a cell; and
a UE for detecting at least one of the first and second SCH sequences for the downlink synchronization.

14. The apparatus as claimed in claim 13, wherein the node B:
transmits the first SCH sequence after mapping the first SCH sequence to the central band in a third sub-frame of a second TTI located after a time interval from the first TTI within the frame; and
transmits the second SCH sequence after mapping the second SCH sequence to at least one of the first and second transmission bands in a fourth sub-frame following the third sub-frame within the second TTI.

15. The apparatus as claimed in claim 13, wherein each of the first and second SCH sequences is transmitted in a last symbol interval of the corresponding sub-frame.

16. The apparatus as claimed in claim 13, wherein each of the first and second SCH sequences includes a Primary SCH (P-SCH) sequence and a Secondary SCH (S-SCH) sequence, the P-SCH sequence being transmitted in a first symbol interval of each of the first and second sub-frames the S-SCH sequence being transmitted in a second symbol interval of each of the first and second sub-frames.

17. The apparatus as claimed in claim 13, wherein the node B transmits the second SCH sequence after mapping the second SCH sequence to one of the first and second transmission bands in the first sub-frame of the first TTI.

18. The apparatus as claimed in claim 13, wherein the first and second transmission bands are located at centers of the useful bands of opposite sides, respectively.

19. An apparatus for receiving a downlink Synchronization CHannel (SCH) in a cellular communication system supporting a scalable system bandwidth and using multiple access technology, the apparatus comprising:
   a node B for transmitting a first SCH sequence and a second SCH sequence for acquisition of downlink synchronization; and
   a User Equipment (UE) for determining whether the UE is camping at a center of a system band, when a bandwidth of the system band is larger than or equal to a double of a reception bandwidth usable by the UE,
   wherein the UE detects a first Synchronization CHannel (SCH) sequence for acquisition of downlink synchronization through a central band having an SCH transmission bandwidth centering a central frequency of the system band when the UE is camping at the center of the system band, and determines a start point of a first sub-frame, to which the first SCH sequence belongs, as a start point of a frame, and
   the UE detects a second SCH sequence for acquisition of downlink synchronization through one of a first transmission band and a second transmission band, when the UE is not camping at a center of the system band, each of the first and second transmission bands having the SCH transmission bandwidth, and determines a start point of a previous sub-frame of a second sub-frame, to which the second SCH sequence belongs, as the start point of the frame, the first transmission band and the second transmission band being located within useful bands of opposite sides adjacent to the central frequency, each of the useful bands having the reception bandwidth.

20. The apparatus as claimed in claim 19, wherein:
the first SCH sequence is transmitted through the central band in a first sub-frame of a first Transmission Time Interval (TTI) selected from among multiple TTIs constituting a frame and a third sub-frame of a second TTI located after a time interval from the first TTI within the frame; and
the second SCH sequence is transmitted through at least one of the first and second transmission bands in a second sub-frame following the first sub-frame within the first TTI and a fourth sub-frame following the third sub-frame within the second TTI.

21. The apparatus as claimed in claim 19, wherein the UE:
acquires downlink synchronization by detecting the first SCH sequence through the central band, when the bandwidth of the system band is smaller than twice the reception bandwidth;
detects the second SCH sequence through at least one of the first and second transmission bands, when the UE has failed to detect a cell IDentifier (ID) from the first SCH sequence; and
acquires the cell ID by using at least one of the first and second SCH sequences.

22. The apparatus as claimed in claim 19, wherein each of the first and second SCH sequences is transmitted in a last symbol interval of the corresponding sub-frame.

23. The apparatus as claimed in claim 19, wherein each of the first and second SCH sequence includes a Primary SCH (P-SCH) sequence and a Secondary SCH (S-SCH) sequence, the P-SCH sequence being transmitted in a first symbol interval of each of the first and second sub-frames and the S-SCH sequence being transmitted in a second interval of each of the first and second sub-frames.

24. The apparatus as claimed in claim 19, wherein the second SCH sequence is transmitted through one of the first and second transmission bands in the first sub-frame of the first TTI.

25. The apparatus as claimed in claim 19, wherein the first and second transmission bands are located at centers of the useful bands of the opposite sides, respectively.

* * * * *